United States Patent [19]

Eide

[11] Patent Number: 4,526,842

[45] Date of Patent: Jul. 2, 1985

[54] THREE-LAYER METAL LAMINATE WITH BIMETALLIC EFFECT, AND THE APPLICATION OF THIS LAMINATE IN COOKING VESSELS

[75] Inventor: Svein Eide, Sandved, Norway

[73] Assignee: Årdal Og Sunndal Verk a.s., Oslo, Norway

[21] Appl. No.: 538,928

[22] Filed: Oct. 4, 1983

[30] Foreign Application Priority Data

Oct. 11, 1982 [NO] Norway ............................ 823396

[51] Int. Cl.³ .............................................. A41J 36/02
[52] U.S. Cl. .................................... 428/617; 428/653; 428/683; 220/454; 220/455; 220/456
[58] Field of Search .................... 428/617, 653, 683; 220/454, 455, 456

[56] References Cited

U.S. PATENT DOCUMENTS

| | | | |
|---|---|---|---|
| 2,470,753 | 5/1949 | Alban | 428/617 |
| 2,494,266 | 1/1950 | Scavullo | 220/454 |
| 2,511,404 | 6/1950 | Glenkey et al. | 220/455 |
| 2,841,137 | 7/1958 | Chace | 220/455 |
| 3,102,793 | 9/1963 | Alban | 428/617 |
| 3,707,359 | 12/1972 | Hanley | 428/617 |
| 4,363,316 | 12/1982 | Aakenus et al. | 220/454 |
| 4,402,454 | 9/1983 | Ty | 428/617 |

FOREIGN PATENT DOCUMENTS

| | | |
|---|---|---|
| 2821408 | 11/1979 | Fed. Rep. of Germany . |
| 1164686 | 10/1958 | France . |
| 71826 | 2/1960 | France . |
| 2181765 | 12/1973 | France . |
| 2440179 | 5/1980 | France . |

Primary Examiner—Veronica O'Keefe
Attorney, Agent, or Firm—Wenderoth, Lind & Ponack

[57] ABSTRACT

A three-layer metal laminate consists of only two different metals with different coefficients of thermal expansion. The two outer layers consist of the same metal, yet of different thicknesses so that, on heating the metal laminate there arises a cotrolled bimetal effect which is utilized in thin-based vessels for hot food, to maintain the base flat on being heated.

9 Claims, 6 Drawing Figures

THREE-LAYER METAL LAMINATE WITH BIMETALLIC EFFECT, AND THE APPLICATION OF THIS LAMINATE IN COOKING VESSELS

BACKGROUND OF THE INVENTION

This invention relates to the construction of a three-layer metal laminate consisting of two different metals, the two outer, thinner, layers being of the same metal, while the middle layer, which is of a different metal, is thicker, with the result that the laminate acquires a bimetal effect. The invention also concerns the application of this laminate in vessels for preparing and keeping food.

It is known that in vessels for preparing food by means of heat, there arises a temperature gradient in the vessel base which can result in its bulging. This deformation impairs the efficiency of heat transfer from flat hotplates, and furthermore results in local overheating of the vessel with scorching of the contents and other unpleasant consequences.

To avoid these difficulties, several possibilities have been tried. In the case of thin-based saucepans it is necessary, for example, to curve the base inwards to prevent the saucepan from "dancing" on the hotplate.

In the case of saucepans of stainless steel of the 18/8 steel type, or of a laminate of stainless steel, it is necessary, in order to make the utensil satisfactory in use, to apply a comparatively thick extra base, usually of copper or aluminum, in order to improve heat distribution. It is further necessary to have comparatively thick material in the sides and in the base to achieve satisfactory stability. As a result of this, saucepans of stainless steel, or of a stainless steel laminate, are comparatively heavy, and production costs are high.

SUMMARY OF THE INVENTION

One of the objects of this invention is to rectify this shortcoming by producing thin-walled saucepans of laminated sheet material with surfaces of stainless steel, thus achieving better use properties than found in earlier, known solutions, while at the same time reducing the production costs of these saucepans.

Surprisingly, it has proved that with this invention, it is possible to avoid bulging when heating thin saucepans. This has been achieved by making the base of a three-layer laminate structure.

The laminate according to the invention, on being heated, deflects in the desired direction and to the desired degree. When this laminate is used for making thin-walled saucepans, the stresses which arise due to the difference in temperature on the outside and the inside and which normally result in bulging of the base, are counteracted, or entirely overcome, by a built in bimetal effect which operates in the opposite direction, i.e. inwards, so that the base remains stable compared with the normal heating pattern.

Thermal deflection of this nature is achieved, according to the invention, by a three-layer metal laminate which in the middle layer consists of a comparatively thick plate of a metal with moderate or good thermal conductivity and both sides of which is clad with thin sheets of a different metal with considerably inferior thermal conductivity, and further than the metals have different coefficients of thermal expansion. The layer on one side preferably has a thickness of 5–10% of the thickness of the middle layer, while the layer on the other side preferably has a thickness of 10–30% of the middle layer. One of the outer layers is preferably at least twice as thick as the other, so that on being heated there arises bimetal deflection.

Experience has shown that when the middle metal has a lower coefficient of thermal expansion than that of the metal in the two outer layers, then one of the outer layers can have a thickness of 15–20% of the middle layer, while the other layer has a thickness of 5–10% of the middle layer.

When the middle metal has a higher coefficient of thermal expansion than the metal in the two outer layers, then the thicker outer layer must be even thicker compared with the other outer layer. The thicker layer can then be 30% of the middle layer, while the thinner outer layer is 10% of the middle layer.

In the event of overheating a saucepan, with contents, the bimetal deflection will increase, and an air space will be formed between the base of the saucepan and the hotplate.

This increases safety because the burning or scorching of the contents is less, and the danger of spontaneous ignition of the contents is less. In principle, this bimetal deflection can also be utilized for controlling the wattage transferred. As the base is thin, yet remains flat, an entirely new principle arises in the use of hotplates. The inertia of heat absorption becomes less, and reaction speed thus greater. In short, the cooking vessel will react faster to adjustments to the energy provided.

Another example of the practical application of the laminate according to the invention is in canteen containers for use in water baths. Standardized canteen containers are to-day in wide use. They are made of stainless steel sheet. Known embodiments of such containers cannot be used for preparing food involving boiling or frying. The bulging of the base and local overheating prevents this. The food has to be prepared in some other way and poured into the container. This has an unwanted mashing and breaking-up effect. The water bath does not provide sufficient heat, and if the contents are to be kept hot for some time, it may be necessary to empty them back into the sucepan for heating on a hotplate. It would be a considerable advantage if canteen containers of sheet metal which fit into standardized water baths could also be used as saucepans.

It is thus also an object of this invention to use a three-layer metal laminate for making cooking vessels or cooking vessels for keeping food hot. In connection with the latter application, reference is made in particular to thin-walled canteen containers with surfaces of austenitic stainless steel, which can be used as saucepans on all heat sources of interest. By way of example, it may be mentioned that mild steel has 330% better thermal conductivity than stainless steel, whereby a steel inlay in the laminate will result in more uniform distribution of heat throughout the base of the vessel.

BRIEF DESCRIPTION OF THE DRAWINGS

A description will now be given, with reference to the drawings, of the application of the three-layer laminate, in which a laminate is used for cooking vessels or for vessels for keeping food hot.

DETAILED DESCRIPTION OF THE INVENTION

Figure 1:
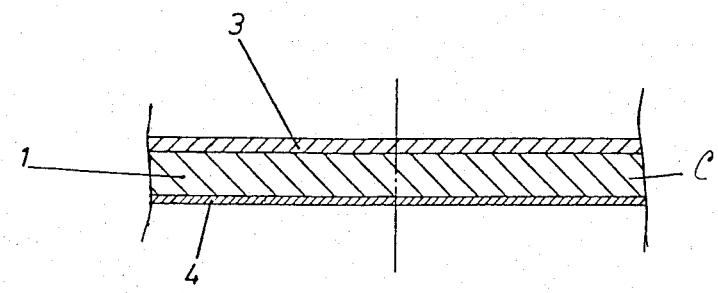
FIG. 1 is a cross-section of a laminate consisting of mild steel clad with austenitic steel, in the cold state.
Figure 2:
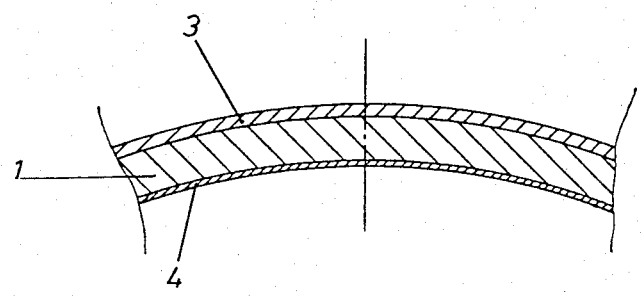
FIG. 2 is a cross-section of the laminate of FIG. 1 in the hot state.
Figure 3:
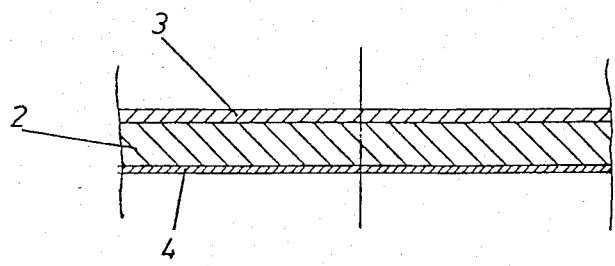
FIG. 3 is a cross-section of a laminate with a core of aluminum clad with austenitic stainless steel, in the cold state.
Figure 4:
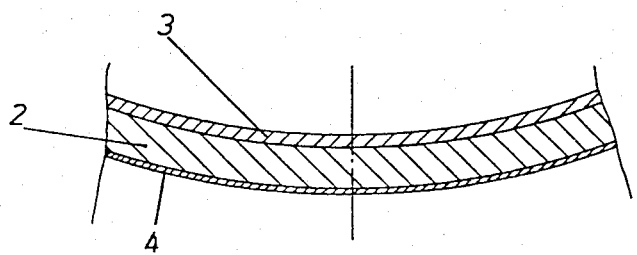
FIG. 4 is a cross-section of the laminate according to FIG. 3 in the hot state.
Figure 5:
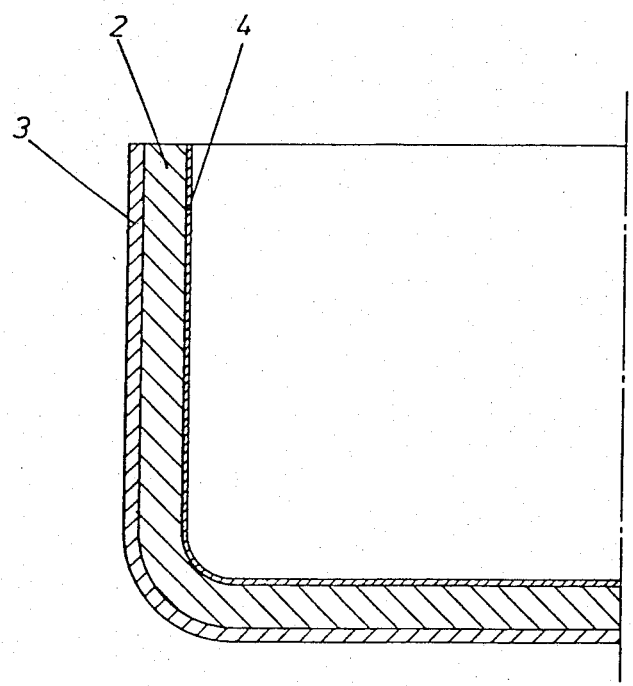
FIG. 5 is a partial cross-section of a vessel made of the laminate according to FIG. 3, in both the cold and hot states.
Figure 6:
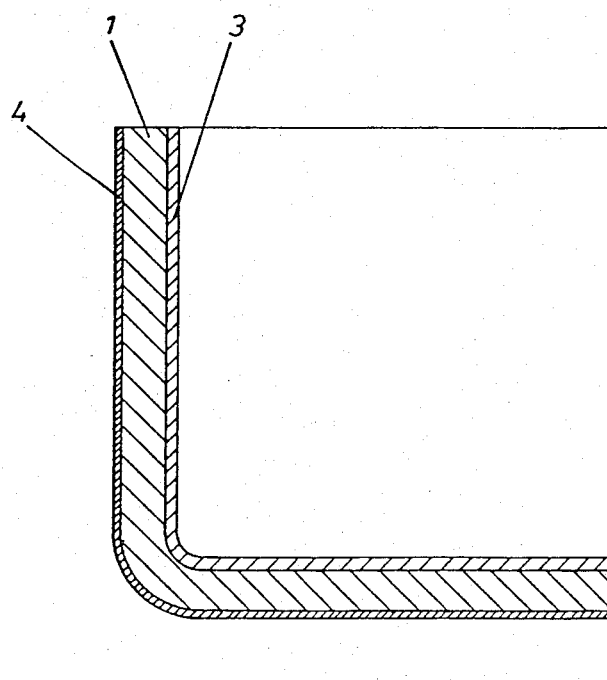
FIG. 6 is a partial cross-section of a canteen container made of the laminate according to FIG. 1 in the hot and cold states.

In the drawings, the various layers are shown enlarged. The middle layer can be a metal with a coefficient of expansion which is less than the coefficient of expansion of the cladding metal, and has thus been given designation 1. When the middle layer has a coefficient of expansion larger than that of the cladding metal, it is given designation 2. The cladding is always of different thicknesses on the two sides. The thicker side is designated 3, and the thinner 4. Preferably, the thicker cladding is 10–30% of the thickness of the middle layer.

In a preferred embodiment, the three-layer laminate consists of a middle layer of aluminum while the outer layers consist of stainless steel, usually 18/8 austenitic steel.

In certain embodiments, it can be avantageous to have mild steel as the middle layer, while the two outer layers consist of stainless steel.

There is nothing to prevent coating or cladding the outer layers with a thin layer of some other material, for example, copper on the outside and/or Teflon on the inside. Also other coatings can be applied.

I claim:

1. A three-layer metal laminate for use in cooking vessels, said laminate comprising:
   a center layer of a first metal having a relatively high thermal conductivity;
   first and second outer layers on respective opposite sides of said center layer, said first and second layers being of the same second metal, different from said first metal of said center layer, having a relatively low thermal conductivity;
   said first and second metals having different coefficients of thermal expansion;
   said first outer layer having a thickness of from 5 to 10% of the thickness of said center layer; and
   said second outer layer having a thickness at least twice said thickness of said first outer layer.

2. A laminate as claimed in claim 1, wherein said thickness of said second outer layer is from 10 to 30% of said thickness of said center layer.

3. A laminate as claimed in claim 1, wherein said first metal comprises aluminum, and said second metal comprises stainless steel.

4. A laminate as claimed in claim 1, wherein said first metal comprises mild steel, and said second metal comprises stainless steel.

5. A food cooking or warming vessel, wherein at least the base of said vessel is formed of the laminate claimed in claim 1.

6. A vessel as claimed in claim 5, wherein said first metal comprises aluminum, and said second metal comprises stainless steel.

7. A vessel as claimed in claim 6, wherein said first outer layer forms the inner surface of said base of said vessel.

8. A vessel as claimed in claim 5, wherein said first metal comprises mild steel, and said second metal comprises stainless steel.

9. A vessel as claimed in claim 8, wherein said second outer layer forms the inner surface of said base of said vessel.

* * * * *